(12) United States Patent
Singh et al.

(10) Patent No.: US 8,244,710 B2
(45) Date of Patent: Aug. 14, 2012

(54) METHOD AND SYSTEM FOR INFORMATION RETRIEVAL USING EMBEDDED LINKS

(75) Inventors: Ajay Kumar Singh, Rohini Delhi (IN); Madhu Syamala, Kerala (IN)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 11/834,665

(22) Filed: Aug. 6, 2007

(65) Prior Publication Data
US 2009/0037409 A1 Feb. 5, 2009

(30) Foreign Application Priority Data
Aug. 3, 2007 (IN) .............................. 1708/CHE/2007

(51) Int. Cl.
*G06F 7/00* (2006.01)
(52) U.S. Cl. ......... 707/710; 707/723; 707/726; 707/737
(58) Field of Classification Search .................. 707/710, 707/723, 726, 737
See application file for complete search history.

(56) References Cited

U.S. PATENT DOCUMENTS

| | | | | |
|---|---|---|---|---|
| 5,920,859 | A  * | 7/1999 | Li | 715/205 |
| 6,023,701 | A  * | 2/2000 | Malik et al. | 1/1 |
| 6,351,467 | B1 * | 2/2002 | Dillon | 370/432 |
| 7,379,932 | B2 * | 5/2008 | Agrawal et al. | 707/710 |
| 7,680,858 | B2 * | 3/2010 | Poola et al. | 707/736 |
| 2002/0078014 | A1 * | 6/2002 | Pallmann | 707/1 |
| 2002/0091684 | A1 * | 7/2002 | Nomiyama et al. | 707/3 |
| 2004/0199501 | A1 * | 10/2004 | Okumura et al. | 707/3 |

* cited by examiner

*Primary Examiner* — Cheyne Ly
(74) *Attorney, Agent, or Firm* — Kilpatrick Townsend & Stockton LLP

(57) ABSTRACT

Retrieving information from information sources using links. A set of information sources is preprocessed to extract content from text and existing links in the information sources according to some predetermined criteria. A set of search results is generated from amongst the preprocessed information sources in response to a received search query.

13 Claims, 4 Drawing Sheets

100

Preprocess a set of information sources to extract content from text and existing links in the information sources. — 105

↓

Receive a search query and identify at least one link within a first information source — 110

↓

Extract information from at least one second information source corresponding to the link in the first information source — 115

↓

Tag the information extracted from the second information source to first information source. — 120

↓

Rank the set of information sources. — 125

↓

Display a set of search results. — 130

FIG: 1

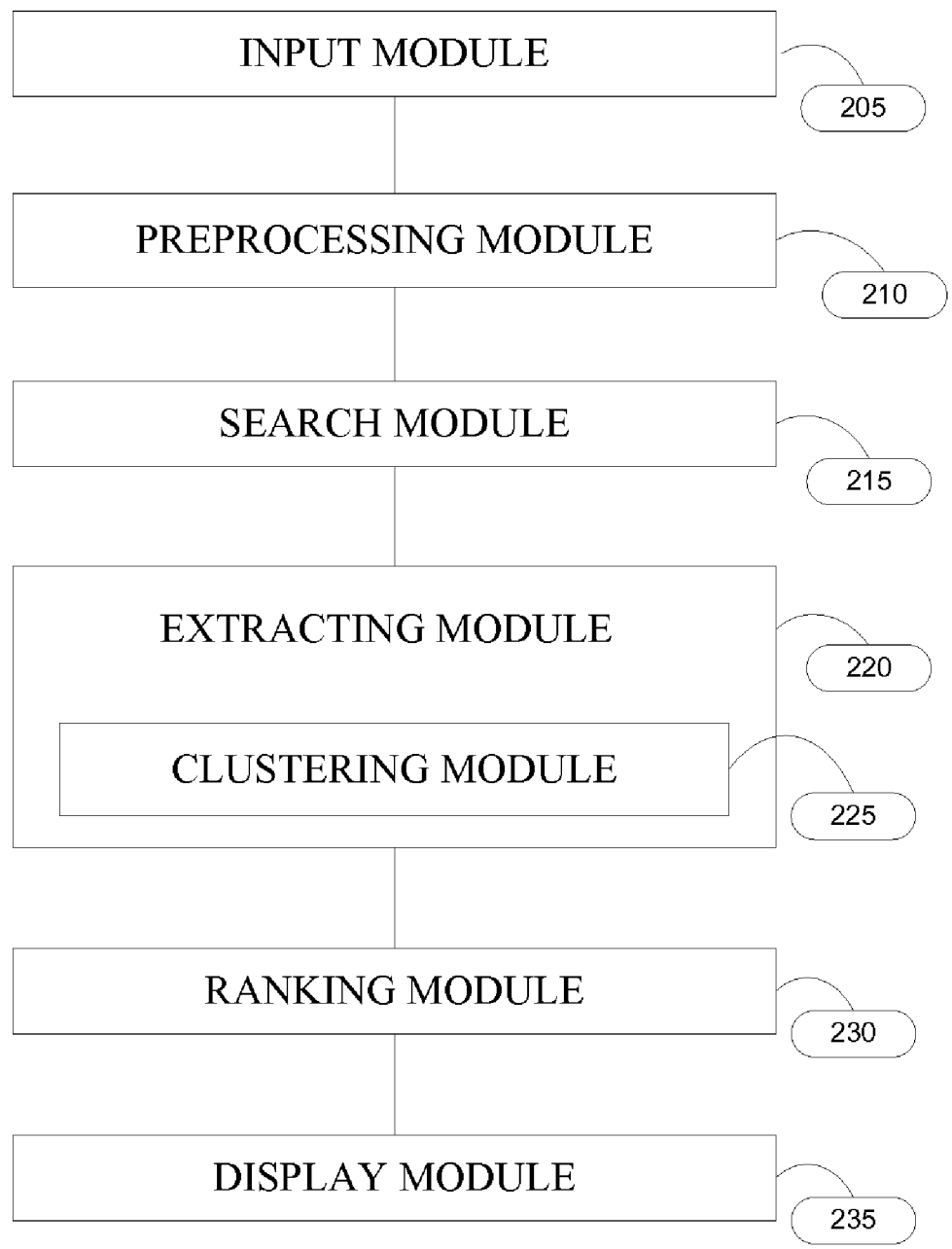
FIG: 2

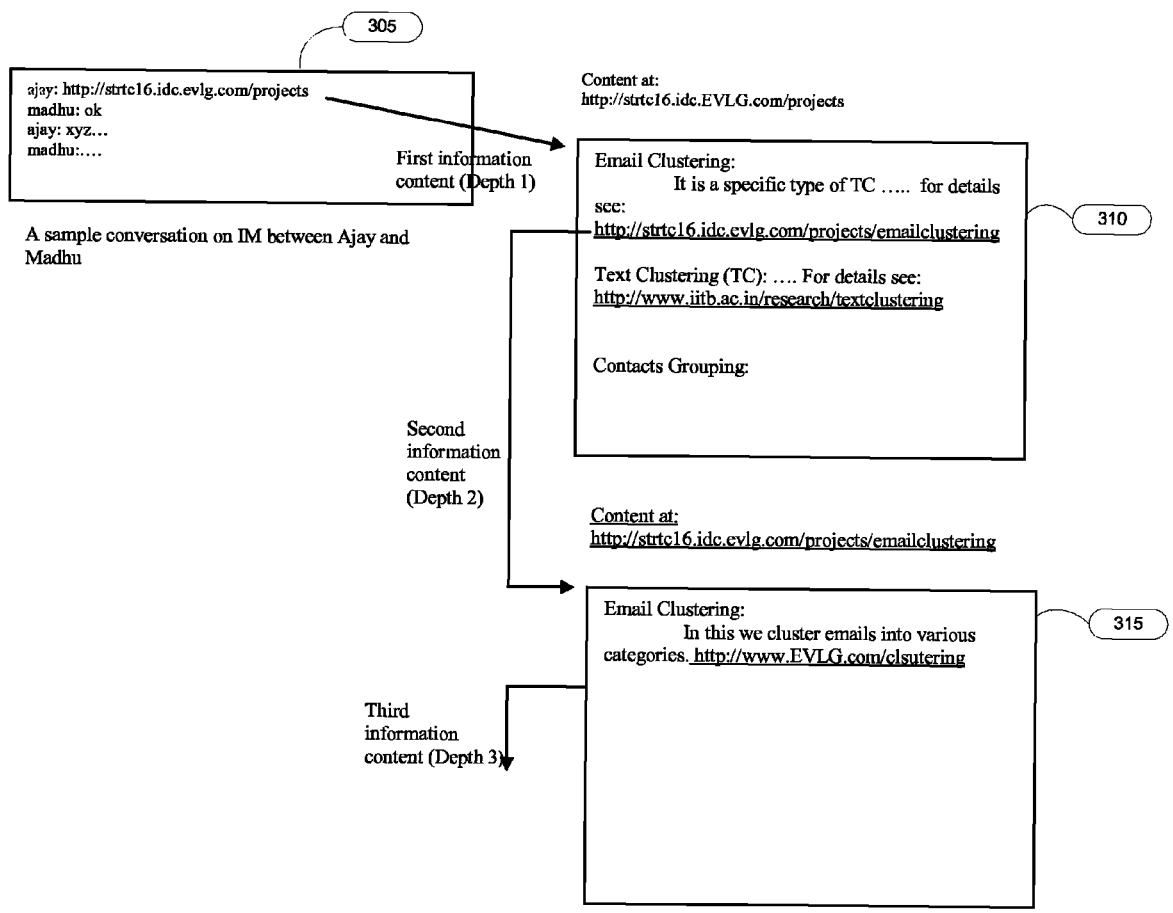
FIG: 3

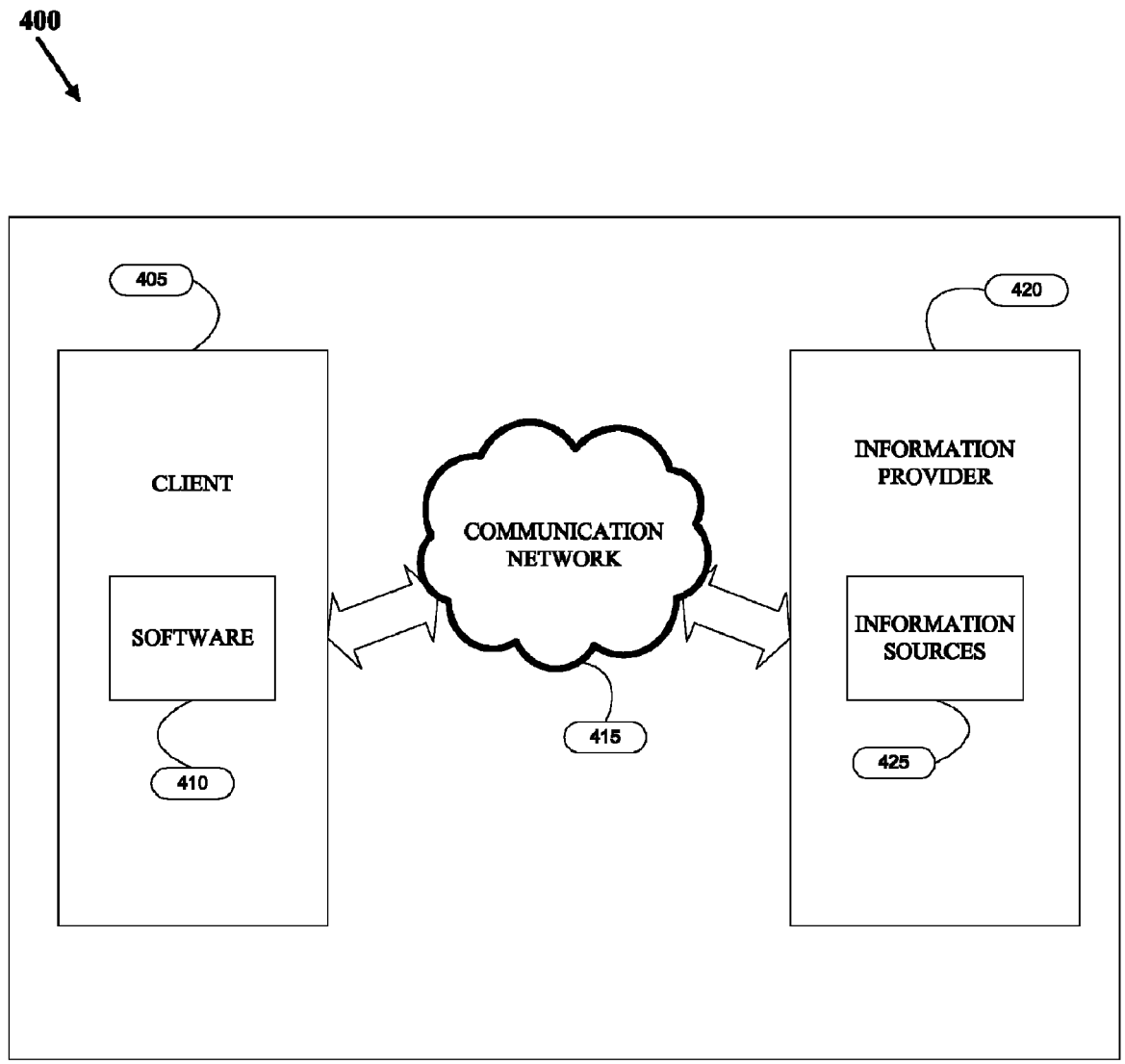
FIG: 4

METHOD AND SYSTEM FOR INFORMATION RETRIEVAL USING EMBEDDED LINKS

BACKGROUND

Embodiments of the invention relate generally to retrieving information from an information source and more particularly to navigating and searching information in an information source which includes embedded links.

An information source may include, for example, electronic files, electronic documents, electronic mail, and instant messenger and may contain various forms of information including text, graphics, audio, video, hyperlink and the like. A hyperlink is a user interface embedded in the information source that may guide a user to other related information sources on demand. Hypermedia, a term derived from hypertext, extends the notion of the hypertext to include links among any set of multimedia objects, including sound, motion video, and virtual reality. It can also connote a higher level of user/network interactivity than the interactivity already implicit in hypertext.

An information source, for example, an electronic document may be searched for relevant information desired by a user. There exist multiple utilities and applications involving a process of document searching in various software applications such as email client software, instant messaging client software, text processing software and the like.

Conventionally, searching relevant information from an information source, for example an electronic document is done by navigating through information content of the electronic document. During navigation, a link embedded in the electronic document is processed as a normal content without considering the attributes of the link. Therefore, the search result corresponding to the information content of the document is very limited. Moreover, if the electronic document lacks a directly matching content for a given search query, the search would give a null result.

The embedded links in the electronic document may contain relevant information such as a directly matching content for the given search query. The information content of an electronic document directed by the hypermedia link may be of significant relevance. Therefore, neglecting this important source of relevant information may cause a user to miss significant information.

Therefore, there exists a need for providing an improved searching mechanism for searching relevant information content of information sources and for providing improved quality search results.

SUMMARY

Embodiments of the invention described herein provide a method, system and computer program product for information retrieval in information centric operations using embedded links in the information sources.

An exemplary embodiment of the invention provides a method for information retrieval from information sources using embedded links in the information sources. The method preprocesses a set of information sources to extract content from text and existing links in the information sources according to some predetermined criteria; and receives a search query and generates a set of search results from amongst the preprocessed information sources in response thereto.

An exemplary embodiment of the invention provides a system for information retrieval from information sources using embedded links in the information sources. The system includes a preprocessing module for preprocessing a set of information sources to extract content from text and existing links in the information sources according to some predetermined criteria; and a search module for receiving a search query and generating a set of search results from amongst the preprocessed information sources in response thereto.

An exemplary embodiment of the invention provides a computer program product stored on a machine-readable medium product, comprising instructions operable to cause a programmable processor to perform operations to provide information retrieval from information sources using links. The computer program preprocesses a set of information sources to extract content from text and existing links in the information sources according to some predetermined criteria; and receives a search query and generates a set of search results from amongst the preprocessed information sources in response thereto.

The above summary of the invention is not intended to describe each disclosed embodiment of the present invention. The figures and detailed description that follow provide additional aspects of the present invention.

BRIEF DESCRIPTION OF DRAWINGS

FIG. 1 is a flow diagram illustrating the sequence of steps of an information retrieval method according to an embodiment of the invention;

FIG. 2 is a block diagram illustrating an information retrieval system according to an embodiment of the invention;

FIG. 3 is a block diagram illustrating an exemplary implementation of the information retrieval method according to an embodiment of the invention; and FIG. 4 is a block diagram of an environment in which various embodiments of the invention may be practiced.

DETAILED DESCRIPTION OF THE EMBODIMENTS

Embodiments of the invention described herein provide a method, system and computer program product for information retrieval in information centric operations using embedded links in the information sources.

FIG. 1 is a flow diagram 100 illustrating the sequence of steps of an information retrieval method according to an embodiment of the invention. Information sources may be in the form of a plurality of electronic files, instant messenger client software, and email client software. Further, the information sources may include one or more links which include embedded links, for example, hypermedia and hypertext links.

Referring to FIG. 1, at step 105, a set of information sources are preprocessed to extract content from text and existing links in the information sources according to a predetermined criteria. The preprocessed information is stored in a database. An embodiment of the invention uses steps 110, 115, 120 and 125 to generate a set of search results from amongst the preprocessed information sources in response to a received search query. At step 110, the search query is received and at least one link within a first information source is identified. A link includes embedded objects, hypertext link, and hypermedia link. For simplicity, embodiments of the invention have been explained using a hypertext link as an example.

At step 115, information is extracted from at least one second information source corresponding to the link in the first information source. The hypertext links in the first information source can be parsed using http protocol. The hypertext links in the first information content may be defined as primary links. Further, all the information sources that the primary links refer to are retrieved and links from the retrieved documents are extracted. The information sources that the primary links refer to may be defined as secondary information sources. In addition to the text and links, other information such as images, audio and video can also be extracted depending on the context in one embodiment of the invention. The extracted information is considered to be a part of the first information source and used in similar manner. Additionally, the secondary links can further be used in the same manner as primary links depending on the user requirements.

One embodiment of the invention provides means for controlling information extracted from information sources. In accordance with this embodiment of the invention, primary links may be considered as links at level 1 and secondary links may be considered as the links at level 2. The links that may be extracted from the information embedded in the links at level 2 may be defined as the links at level 3 and levels of the links can be defined in a similar manner. The depth of a link may be defined as level of the link. In an embodiment, a user may choose the maximum depth of the link to limit the information extracted. As the level of the link increases, the amount of information extracted from the links of those levels can be decreased. For example, if the user limits the maximum depth of the links to 2 then the information is extracted only from primary and secondary links. In default settings, information is extracted from the primary link.

At step 120, information extracted from the second information source is tagged to the first information source. Information extracted is ranked based on various criteria at step 125.

As will be known to one skilled in the art, various search engines provide ranking to web pages on internet for improved quality of search results. Ranking of web pages exploits various methods including tag based ranking. A tag is a keyword or term associated with or assigned to an electronic document such as a web page. One example of various tags is a "title tag" assigned to the title of the electronic document.

One embodiment of the invention clusters one or more first information sources if the one or more first information sources are related to each other through one or more second information sources.

As will be apparent to one skilled in the art, the second information source may have one or more tags associated with the one or more information sources extracted from one or more hypertext links. For example, an information source may contain tags such as <H1> topic 1 </H1> and <H2> topic 2 </H2>. A rank is assigned to each tag of the information source. Information of each tag inherits the ranking of the tag. In this way, all information content of the information source is assigned a rank, for example on the scale of 1 to 10.

In accordance with various embodiments of the invention, the information source including tags, for example, "<H1> topic 1 </H1>" and "<H2> topic 2 </H2>", tag <H1> may be assigned with a rank 4 and tag <H2> may be assigned with a rank 6. Therefore, the information content of tag <H1> will inherit a rank 4 and the information content of tag <H2> will inherit a rank 6. In a similar way, contents of the second information content are ranked.

In addition, rank of a tag may be compared with a threshold value defined by the user. The threshold value may be customized on the requirement of the application and is set by the user. The threshold rank may also be tuned based on the depth of the hypertext link level. If the rank of a tag is higher than the set threshold value, then the information content inside the tag is considered for further processing such as navigation of information retrieval. However, on the other hand, if the rank of the tag is lower than the set threshold value, the information content inside the tag would be dropped off for the further processing. For example, if the threshold value is set 5, then content inside tag <H2> will be selected for further processing and content inside tag <H1> will be dropped off from the further processing. Though the invention is described with reference to a tag based ranking system, it may apparent to one skilled in the art that various other ranking methods may be used in a similar way to improve the search results.

At step 130 a set of search results is displayed in response to an input where a user can control the search with a purpose to provide an improved search result. The search result may also be customized according to the requirement of a user. Here, controlling the second information content may include limiting the maximum information extracted from each hypertext link, in accordance with an embodiment of the invention. Also, in accordance with an alternative embodiment of the invention, controlling the second information content includes limiting the maximum amount of information extracted from an information source. Further, in accordance with another embodiment of the invention, the maximum amount of information extracted from the second information content can be limited.

It will be appreciated that the exemplary illustration of the embodiments of the invention using hypertext links is provided by way of illustration and not by limitation. Embodiments of the invention can be used to extract any extractable embedded links in the information sources.

FIG. 2 is a block diagram 200 illustrating an information retrieval system according to an embodiment of the invention. The block diagram 200 includes an input module 205, a preprocessing module 210, a search module 215, an extracting module 220, a ranking module 230 and a display module 235. The extracting module 220 further includes a clustering module 225.

The preprocessing module performs step 105 of preprocessing a set of information sources to extract content from text and existing links in the information sources according to some predetermined criteria. The input module 205 performs the step of receiving a search query. The search module 215 performs the step 110 of identifying at least one link within a first information source. The extracting module 220 performs step 115 of extracting information from at least one second information source corresponding to the link in the first information source. The extracting module 220 further includes a clustering module 225 for clustering one or more first information sources of the set of first information sources if the one or more first information sources are related to each other through one or more second information sources. The ranking module 230 performs step 125 of ranking a set of information sources. The display module 235 displays a set of search results FIG. 3 is a block diagram 300 illustrating an exemplary implementation of the information retrieval method according to an embodiment of the invention. Block diagram 300 includes a first information source 305, a second information source 310 and a third information source 315. The first information source is an Instant Messenger (IM) conversation between two users 'Ajay' and 'Madhu'. Consider that a user is searching for the keyword 'Patent' from his/her IM conversations. First information source 305 (Depth 1 as labeled in FIG. 3) further includes a link which can be referenced as a hypertext link labeled as http://strtc16.idc.evlg.com/projects in FIG. 3. This hypertext link can be considered as a primary link. This primary link includes the keyword 'patent' the user is searching for. Upon identifying the primary link, information is extracted from the primary link. The information extracted from the primary link is referenced as the second information source 310 (Depth 2 as labeled in FIG. 3). The second information source may include a plurality of hypertext links as shown in the block diagram 300. These hypertext links can be considered as secondary links which may include the keyword 'patent'. The information extracted from one of the secondary links as shown in the block diagram 300 (http://strtc16.idc.evlg.com/projects/emailclustering) is referenced as the third information source 315 (Depth 3 as labeled in FIG. 3). In a similar way, embodiments of the invention extract information from information sources from the links and that information is propagated back to the primary links. The search result in this exemplary implementation will display the first information source. The maximum depth of the information source can be limited by the user according to an embodiment of the invention as explained earlier.

Among other advantages that will be apparent to those skilled in the art, the information retrieval method of the invention may be used to obtain enhanced search results by retrieving the information sources, which do not have the content directly matching the user supplied input. Further, the information retrieval method may be used to cluster various information sources based on the content retrieved from the embedded links. Also, the information retrieval method of an embodiment of the invention will enhance the browsing experience of a user.

FIG. 4 is a block diagram of an environment in which various embodiments of the invention may be practiced. The block diagram 400 may describe a hardware arrangement that may be used for the implementation of various embodiments of the invention. The block diagram 400 includes a client 405, preferably including a personal computer and other link selection, retrieval and rendering devices. The block diagram 400 also includes an information provider 420 that provides information sources 425 with embedded links to the client 405 through conventional communication networks 415 and protocols such as the Internet, wide-area or local-area network, or some other type of information distribution media.

Client 405 includes information retrieval and rendering software 410 for retrieving information from information provider 420 and for rendering it in accordance with various embodiments of the invention. Software 410 is capable of implementing the method of invention as described above in detail. Software 410 resides on a computer-readable storage medium such as a magnetic storage or electronic randomly-addressable memory, programmed in accordance with steps in the aforementioned method embodiment of the invention.

Information provider 420 includes the set of information sources 410 in the form of a number of computer-readable electronic documents, files, electronic mail client software, and instant messenger client software. These information sources 410 include information content for displaying or rendering to a user. Any of these information sources 425 may potentially include embedded links pointed to other information sources 425. The client 405 obtains and displays information sources 425 which include embedded links.

A user requests for retrieving information from information provider 420 through client 405. Client 405 then activates software 410. Software 410 retrieves information from the information provider 420. Retrieved information is then displayed to the user through the client 405.

The forgoing description sets forth numerous specific details to convey a thorough understanding of the invention. However, it will be apparent to one skilled in the art that the invention may be practiced without these specific details.

Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A method comprising:
preprocessing, by a preprocessing module, a set of information sources to extract content from text and existing links and to extract attributes of the existing links in said set of information sources according to some predetermined criteria, wherein the existing links have a primary link and have associated levels which increase from the primary link's level, and wherein the extracting includes:
limiting the depth of information extracted from the set of information sources in response to an input,
limiting the maximum amount of information extracted from the set of information sources, wherein the set of information sources includes at least a first information source and a second information source, and wherein the first information source at least includes the primary link,
limiting the maximum amount of information extracted from at least one page of the first information source and the second information source,
ranking the set of information sources automatically or in response to an input,
determining that said first information source is related to the second information source, and
in response to determining that said first information source is related to the second information source, clustering the first information source, wherein the second information source corresponds to the existing links of the first information source, and wherein maximum information is extracted from the second information source is limited based on the level of the link;
receiving, by a search module, a search query and extracting search results from amongst the preprocessed information sources based on the content from the text and the existing links;
generating search results based on content from the existing links which comprises extracting information from the second information source;
tagging said content extracted from the links in said information sources, wherein a tag includes a keyword or term associated with the extracted content; and
displaying said set of search results.

2. The method of claim 1 wherein the set of information sources comprises electronic mail, instant messenger, workspace, calendar, web pages and combinations thereof.

3. The method of claim 1, wherein said existing links comprise a hypertext link, a hyper media link and an embedded object.

4. The method of claim 1, further comprising:
ranking each of the tags; and
comparing each of the ranked tags with a threshold value, wherein the threshold value is tuned to the depth of the level of the link associated with the tag, and wherein the higher the level the higher the threshold.

5. The method of claim 4, further comprising if the rank of the tag is higher than the threshold value, processing the information content of the associated link.

6. A computer program stored on a tangible machine-readable medium product, comprising instructions operable to cause a programmable processor to:

preprocess a set of information sources to extract content from text and existing links and to extract attributes of the existing links in said set of information sources according to some predetermined criteria, wherein the existing links have a primary link and have associated levels which increase from the primary link's level, and wherein the extracting includes:
  limiting the depth of information extracted from the set of information sources in response to an input,
  limiting the maximum amount of information extracted from the set of information sources, wherein the set of information sources includes at least a first information source and a second information source, and wherein the first information source at least includes the primary link,
  limiting the maximum amount of information extracted from at least one page of the first information source and the second information source,
  ranking the set of information sources automatically or in response to an input,
  determining that said first information source is related to the second information source, and
  in response to determining that said first information source is related to the second information source, clustering the first information source, wherein the second information source corresponds to the existing links of the first information source, and wherein maximum information is extracted from the second information source is limited based on the level of the link;
receive a search query and extract search results from amongst the preprocessed information sources based on the content from the text and the existing links;
generate search results based on content from the existing links which comprises extracting information from the second information source;
tag said content extracted from the links in said information sources, wherein a tag includes a keyword or term associated with the extracted content; and
display said set of search results.

7. The product of claim 6, wherein the set of information sources comprises electronic mail, instant messenger, workspace, calendar, web pages and combinations thereof.

8. The product of claim 6, wherein said existing links comprise a hypertext link, a hyper media link and an embedded object.

9. The computer program stored on a tangible machine-readable medium product of claim 6, wherein the instructions are further operable to cause the programmable processor to:
  rank each of the tags; and
  compare each of the ranked tags with a threshold value, wherein the threshold value is tuned to the depth of the level of the link associated with the tag, and wherein the higher the level the higher the threshold.

10. The computer program stored on a tangible machine-readable medium product of claim 9, wherein the instructions are further operable to cause the programmable processor to if the rank of the tag is higher than the threshold value, process the information content of the associated link.

11. A system comprising:
a storage memory; and
a processor coupled with the storage memory, the storage memory having sets of instructions stored thereon, which when executed by the processor, cause the processor to:
  preprocess a set of information sources to extract content from text and existing links and to extract attributes of the existing links in said set of information sources according to some predetermined criteria, wherein the existing links have a primary link and have associated levels which increase from the primary link's level, and wherein the extracting includes:
    limiting the depth of information extracted from the set of information sources in response to an input,
    limiting the maximum amount of information extracted from the set of information sources, wherein the set of information sources include at least a first information source and a second information source, and wherein the first information source at least includes the primary link,
    limiting the maximum amount of information extracted from at least one page of the first information source and the second information source,
    ranking the set of information sources automatically or in response to an input,
    determining that said first information source is related to the second information source, and
    in response to determining that said first information source is related to the second information source, clustering the first information source, wherein the second information source corresponds to the existing links of the first information source, and wherein maximum information is extracted from the second information source is limited based on the level of the link;
  receive a search query and extract search results from amongst the preprocessed information sources based on the content from the text and the existing links;
  generate search results based on content from the existing links which comprises extracting information from the second information source;
  tag said content extracted from the links in said information sources, wherein a tag includes a keyword or term associated with the extracted content; and
  display said set of search results.

12. The system of claim 11, wherein the sets of instructions further cause the processor to:
  rank each of the tags; and
  compare each of the ranked tags with a threshold value, wherein the threshold value is tuned to the depth of the level of the link associated with the tag, and wherein the higher the level the higher the threshold.

13. The computer program stored on a tangible machine-readable medium product of claim 12, wherein the sets of instructions further cause the processor to if the rank of the tag is higher than the threshold value, process the information content of the associated link.

* * * * *